Feb. 10, 1931.  J. W. BRYCE  1,791,951
FACTOR LEVER WEIGHING SCALE
Filed March 17, 1927  10 Sheets-Sheet 2

Fig. 2.

Inventor
JAMES W. BRYCE
By his Attorney

Feb. 10, 1931.                J. W. BRYCE                1,791,951
                      FACTOR LEVER WEIGHING SCALE
                      Filed March 17, 1927        10 Sheets-Sheet 3

Inventor
JAMES W. BRYCE
By his Attorney
W. M. Wilson

Feb. 10, 1931.  J. W. BRYCE  1,791,951
FACTOR LEVER WEIGHING SCALE
Filed March 17, 1927   10 Sheets-Sheet 8

Inventor
JAMES W. BRYCE
By his Attorney

Patented Feb. 10, 1931

1,791,951

UNITED STATES PATENT OFFICE

JAMES W. BRYCE, OF BLOOMFIELD, NEW JERSEY, ASSIGNOR TO DAYTON SCALE COMPANY, OF DAYTON, OHIO, A CORPORATION OF NEW JERSEY

FACTOR-LEVER WEIGHING SCALE

Application filed March 17, 1927. Serial No. 176,005.

This invention relates to weighing scales and more particularly to scales of the factor lever type.

In certain types of weighing scales commonly called computing scales, a price chart is provided which indicates products of the weight of applied articles and various prices per unit weight. Various arrangements have been employed for indicating such products, one being to print a complete chart in which different products are simultaneously visible and allowing the operator to select the desired product. Another arrangement was to provide a chart operated in conjunction with load off-setting mechanism in response to a load applied on a weighing platform and varying by means of a series of factor levers the ratio of the transmitted load to that applied on the platform. The load transmitting ratio is varied by rendering inoperative certain selected levers. In scales of the latter type heretofore designed no means has been incorporated for indicating the weight of the article simultaneously with the total price. Furthermore, various levers were disconnected from the load off-setting mechanism and rendered inoperative at times whereby the load was transmitted by the remaining operative levers only.

It is an object of this invention to provide a computing scale of the factor lever type in which both the weight indications and price indications may be viewed simultaneously.

Another object is to provide a scale of the above type in which the price index, the weight and the total price of an article may be simultaneously displayed.

A further object is to provide a factor lever scale in which each factor lever is at all times in operative condition.

A still further object is to provide a computing scale of simplified and improved construction as hereinafter set forth.

The above objects and others which will appear as the nature of the invention is disclosed are accomplished in accordance with the present invention by providing a platform scale in which a plurality of load offsetting devices are employed, one device being utilized for controlling a weight chart and the other being employed to operate a price chart. A system of factor levers determines the ratio of the load applied to that transmitted to the two devices. The factor levers are permanently connected to the weight indicating device but are selectively connected by controlling keys to the price indicating device as desired in accordance with the price of the article being weighed.

Although the novel features which are believed to be characteristic of this invention will be pointed out with particularity in the claims appended hereto the invention itself as to its objects and advantages, the mode of its operation and the manner of its organization may be better understood by referring to the following description taken in connection with the accompanying drawings forming a part thereof in which:

Before proceeding with the detailed disclosure in connection with the figures of the drawings, the general plan of operation of the scale will be briefly described. The scale is designed to indicate weights in combination with the price of the commodity which is being weighed and provision is also made to indicate the price per unit weight of the commodity. A weighing chart and a total price chart are therefore provided which are operated by different scale beams hereinafter referred to as the weight beam and the price beam respectively. The load receiving platform or receptacle is operatively connected to load offsetting pendulums as is usual in scales of this type. A weighing load on the scale is transmitted through a lever system to both the weight beam and the scale beam. This lever system includes a plurality of factor levers each of which is permanently, operatively connected to the load receiving platform or receptacle and to the weight beam so that all the factor levers are effective for every weighing operation. Each of the factor levers is normally disengaged from the price beam but any number or all of them may be operatively associated with it at will. The systems for interconnecting the various factor levers with the platform system have different distinctive operating ratios so that by varying the number of factor levers which are connected to the price beam this beam may be operated in accordance with different predetermined portions of the applied load. The weight beam and the price beam are each provided with individual load offsetting pendulums so that their load offsetting operations are entirely independent of each other except in so far as they are operated by the common factor levers. It will be understood then that every factor lever in the system is always operative so far as the weight beam is concerned while any number of them may be made operative with regard to the price beam.

Figure 15:
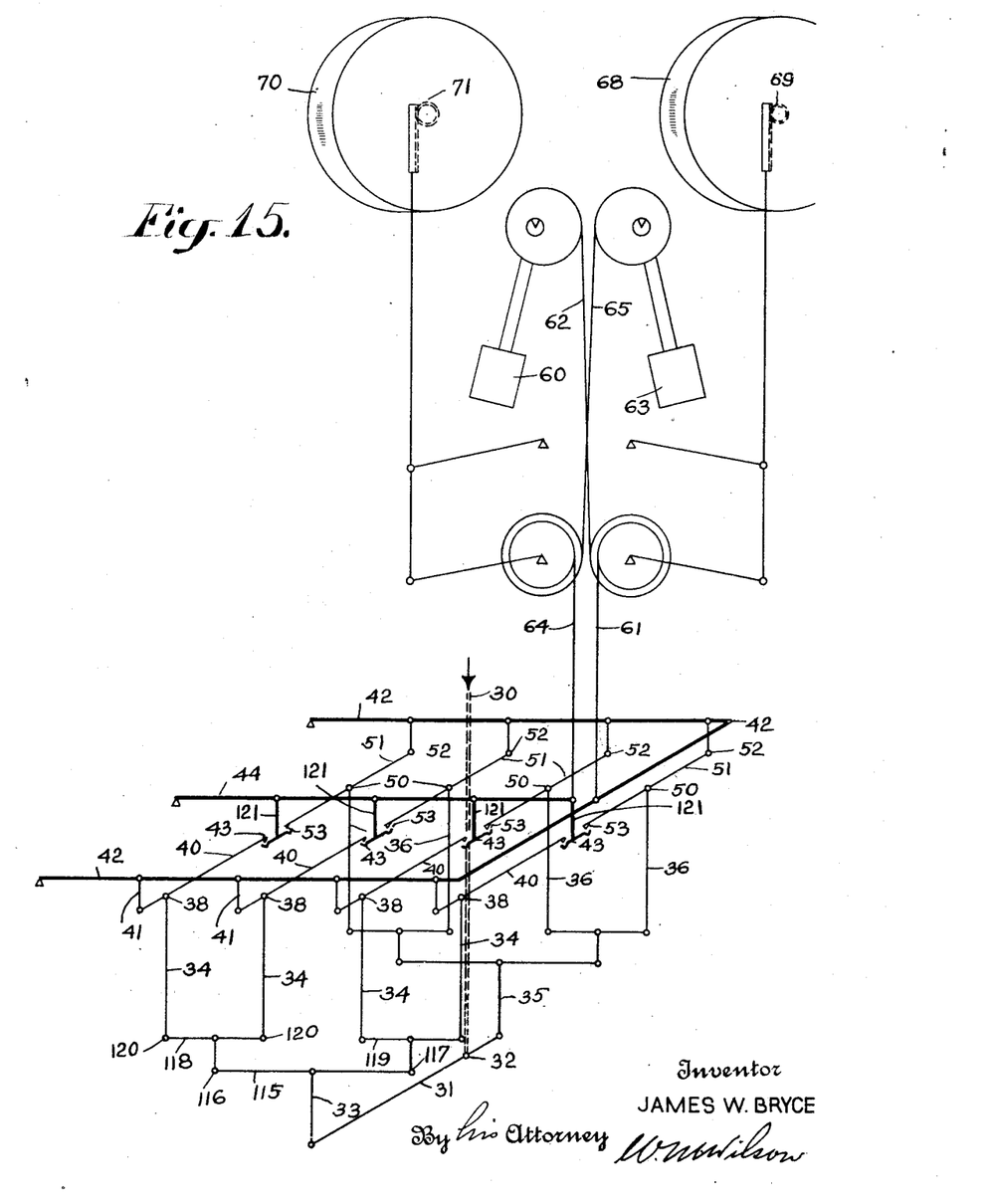
Fig. 15 is a diagrammatic representation of the factor lever combination employed in the present scale.

The schematic arrangement of the factor levers and other levers of the scale will be more clearly understood from Fig. 15 in which the levers and beams are represented diagrammatically in connection with associated load offsetting pendulums and charts. Referring to this figure it may be assumed that a vertical member 30, illustrated in dotted lines, is connected to the platform or load receptacle so that it will be forced downward when a load is placed thereon. This member 30 at its lower end is pivoted at 32 to a lever 31, the pivot point 32 in this particular example dividing the lever into two portions in the ratio of one to four. The lever 31 at one end is connected by a link 33 to the middle point of a lever 115 and owing to the ratio of the arm to the lever 31 it will be obvious that one-fifth of the load applied to the member 30 will be transmitted to the lever 115. The latter lever is provided with end pivots 116 and 117 which through suitable links are connected to the middle points of levers 118 and 119, respectively, which in turn are connected at their ends through links 34 to individual factor levers 40, the pivot points on the factor lever being designated at 38. This pivot point divides each of the factor levers in the ratio of one to four. The shorter arm of each of these factor levers is permanently connected to the weight beam 42 by links 41 while the longer arms are normally disconnected from the price beam 44 but each of them may be individually pivoted to the stirrup 121 on the lever 44, if desired. The weight beam 42 is of U-shape and factor levers 51 forming an additional set are connected by the links 36 to the end of the short arm of lever 31 in a manner entirely similar to that just described. The links 36 at their upper ends, however, are connected to the middle point of the factor levers 51. The weight lever 42 is connected through tapes 61 and 62 to an offsetting pendulum 60 and through a suitable rack and pinion 69 to a weight chart 68. The price beam 44 through tapes 64 and 65 is connected to a load offsetting pendulum 63 and through rack and pinion 71 to a price chart 70. As each of the factor levers 40 and 51 are permanently connected to the weight beam 42 it is obvious that all the factor levers are operative in the weighing operation and a definite and unchangeable ratio of the weight applied to beam 30 will be transmitted to and balanced by pendulum 60. Hence the reading of weight chart 68 is not varied by the factor levers. As the pivots 43 and 53, however, can be individually connected to or disconnected from the price beam 44 at will the force applied from member 30 through levers 40 and 51 to price beam 44 for any given weighing load may be varied and the indication of the price chart correspondingly controlled in accordance with different predetermined factors of the load. The ratio of the weight applied to the member 30 to the force transmitted to the price beam 44 may be analyzed by a specific example in which a load of one pound is applied to member 30 and is considered to consist of one hundred units of force. In that case one-fifth or twenty units of the load will be applied to the link 33 and transmitted to the factor levers 40 and four-fifths of the load or 80 units will be applied through the link 35 to the factor levers 51. This results, of course, from the one to four ratio of the arms of lever 31. The twenty units applied to link 33 are divided into four equal parts of five units each by the levers 115, 118 and 119 and one part of five units is transmitted by each link 34 to its attached factor lever 40. Owing to the ratio of the arms of these factor levers the force of five units received by each will be again divided; four units being applied to the weight beam 42 and one unit being effective at pivot 43. The force of 80 units transmitted through the link 35 will be ultimately equally distributed to the factor levers 51 each of these four factor levers receiving 20 units of which ten units are transmitted to the weight beam 42 through each link 52 and of which ten units are effective at each pivot 53. The stirrups 121 on the price beam 44 which carry the pivot bearings for the factor levers are spaced along the price bar 44 at equal progressive distances so that if the factor lever 40 nearest the pivot of the beam is pivoted to its stirrup 121 a force of a definite value which may represent one unit of value, for example one cent per pound is effective in displacing the price pendulum 63 and consequently the price chart 70. The next factor lever 40, if pivoted on its stirrup 121, will be twice as effective in displacing the price beam and the price chart 70 and consequently would represent a value of two cents per pound. In like manner the other factor levers to the right may represent values of three and four cents per pound respectively. By selectively connecting two or more of the factor levers 40 to the price beam forces corresponding to values up to ten cents will be effective on the price beam.

In a similar manner the factor lever 51 nearest the pivot of price beam 44 may transmit a force to this beam corresponding to ten cents and by different combinations of the factor levers 51 forces corresponding to values of ten cents up to one dollar may be transmitted to the price lever 44. It is obvious then that the total force which may be applied to the price lever represents $1.10 per pound. As these money values are all referred to a weight of one pound placed on the member 30 it is obvious that if more than one pound is placed on the member 30 a reading on the price chart 70 will indicate the total price of the article being weighed at the selected price per pound.

Figure 1:
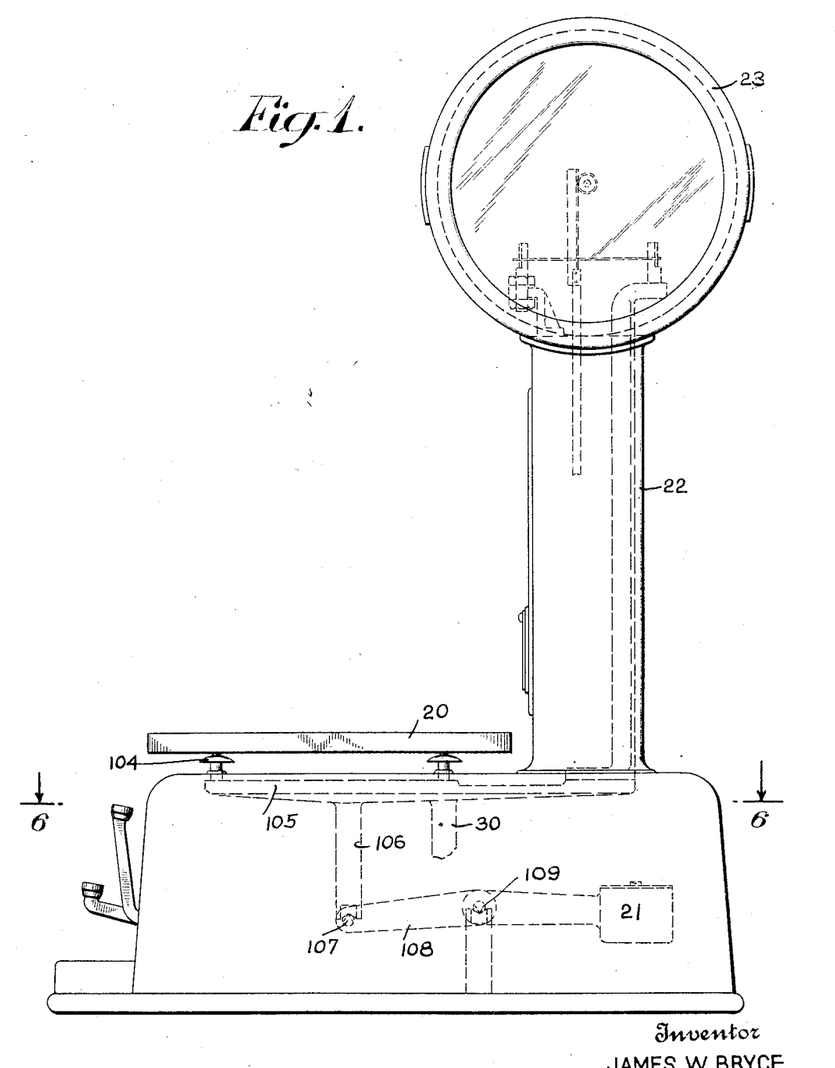
Fig. 1 is an elevation of a conventional type of platform weighing scale.
Figure 2:
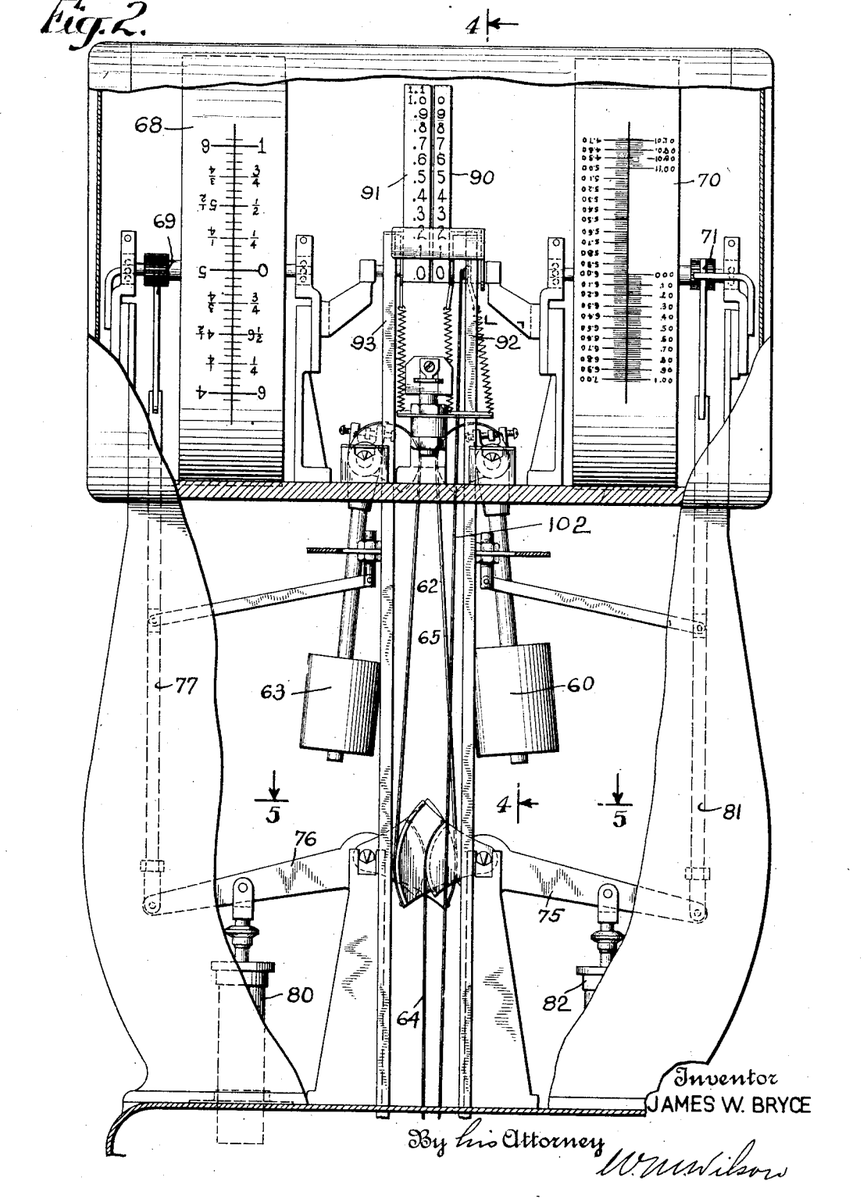
Fig. 2 is an elevation of a portion of the scale showing the indicating charts constructed in accordance with this invention.

The structural details of the scale are indicated generally in Figs. 1 and 2. In Fig. 1 a scale of the platform type is indicated as having a platform 20 resting on supports 104 integral with a supporting structure 105. A member 106 depends upon the structure 105 and rests upon a knife edge 107 carried by a lever 108 which carries a counter weight 21. Obviously this weight counter balances a portion of the load applied to the platform. The unbalanced portion of the load is transmitted by a member 30 depending upon the structure 105 to a system of levers represented in Fig. 15 as will hereinafter be described.

Referring to Fig. 2 the weight chart is indicated at 68 and consists of two adjacent scales reversed with respect to each other and displaced 180 degrees with respect to each other so that one scale may be read on one side of the chart housing and the other scale on the other side with identical indications on both sides. This chart 68 is connected to the weight beam 42 through a suitable tape by means of a lever 76 having a suitable sector or cam integral therewith and a link 77 which operates a rack and pinion 69 associated with the chart. The dash pot 80 is associated with the lever 76 to dampen the oscillations of the structure. The price chart 70 is operated from the price beam in a similar manner through the lever 75, link 81 and rack and pinion 71, a dash pot 82 being associated with the lever 75 to dampen oscillations in this part of the structure. Suitable sectors or cams on the arms 75 and 76 are connected through tapes 65 and 62 respectively to the load offsetting pendulums 63 and 60. When the total price of an article being weighed is indicated in this manner it is often desirable to indicate the price per unit weight and this is provided for in the indices 90 and 91. These indices are arranged to indicate by their position the particular price per unit weight selected for the price computation and are operated as will hereinafter be described by the mechanism which effects pivotal connection of the several factor levers 40 and 51 with the price beam 44.

Figure 6:
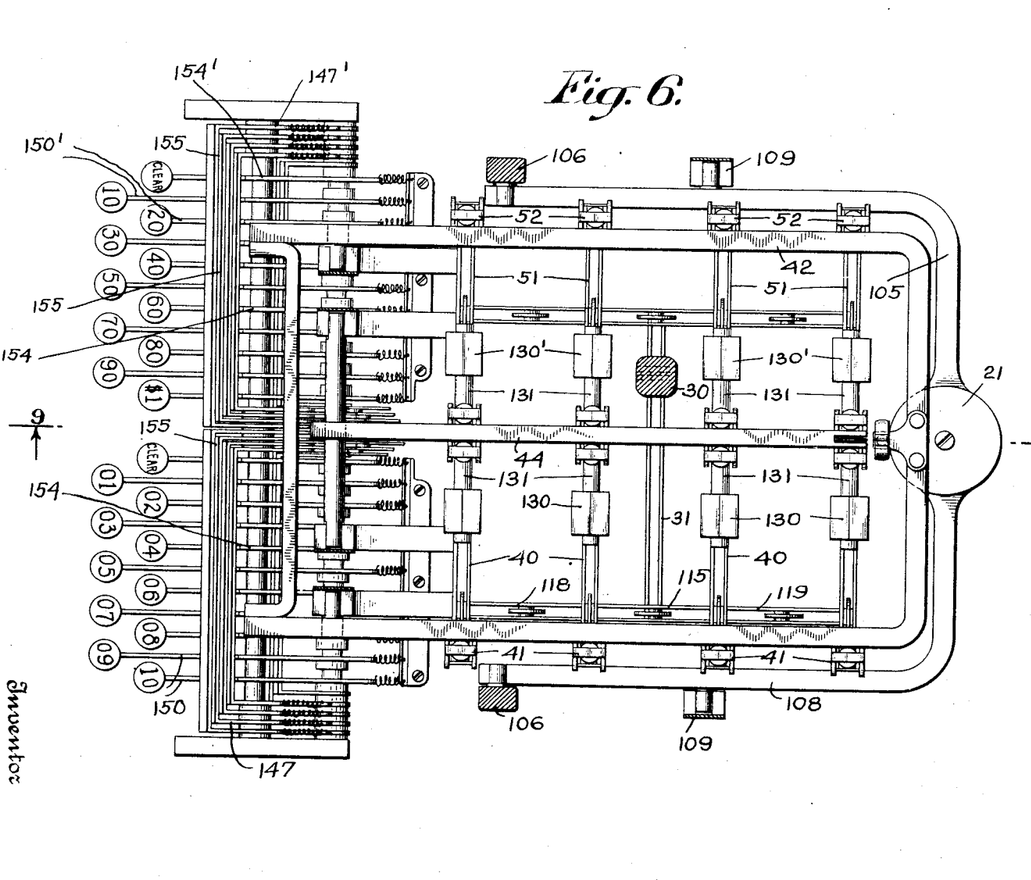
Fig. 6 is a plan view of the factor lever arrangement.
Figure 7:
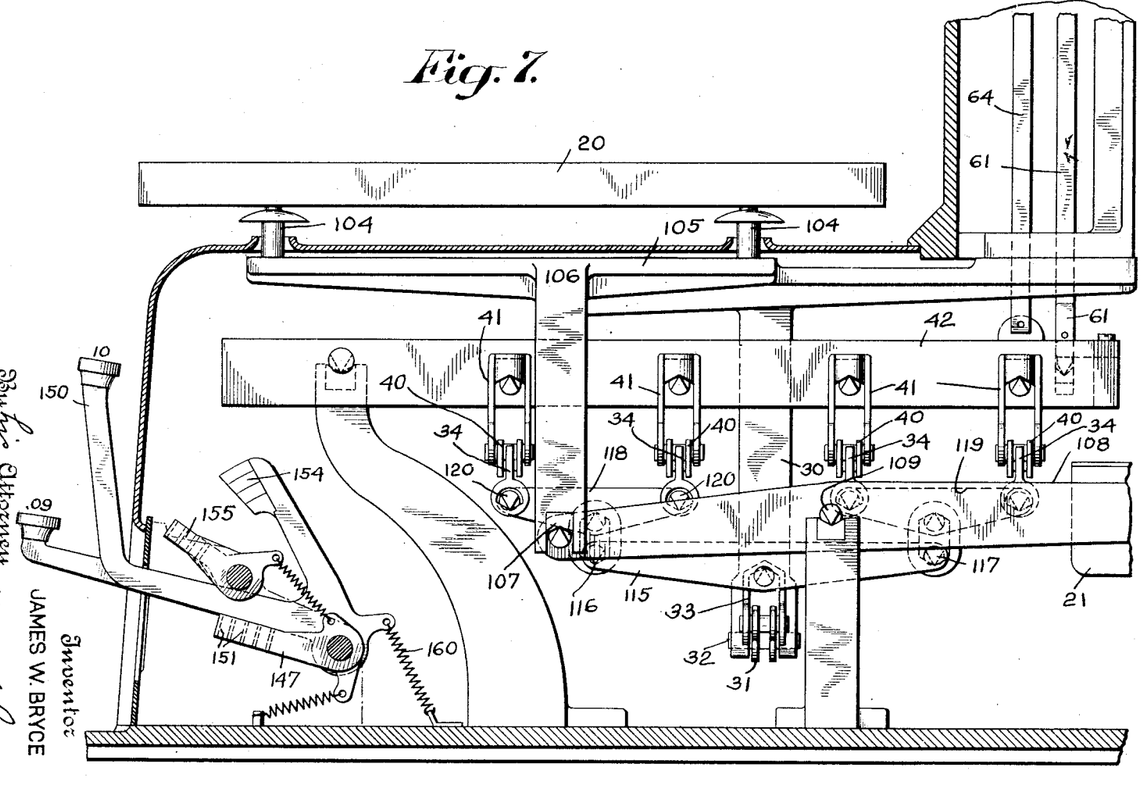
Fig. 7 is an elevation of the factor lever mechanism.
Figure 8:
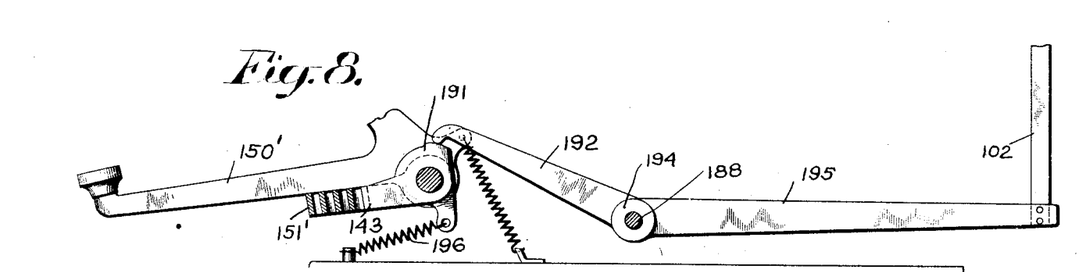
Fig. 8 is a detail view of the mechanism for controlling the price shutter.
Figures 10, 10A:
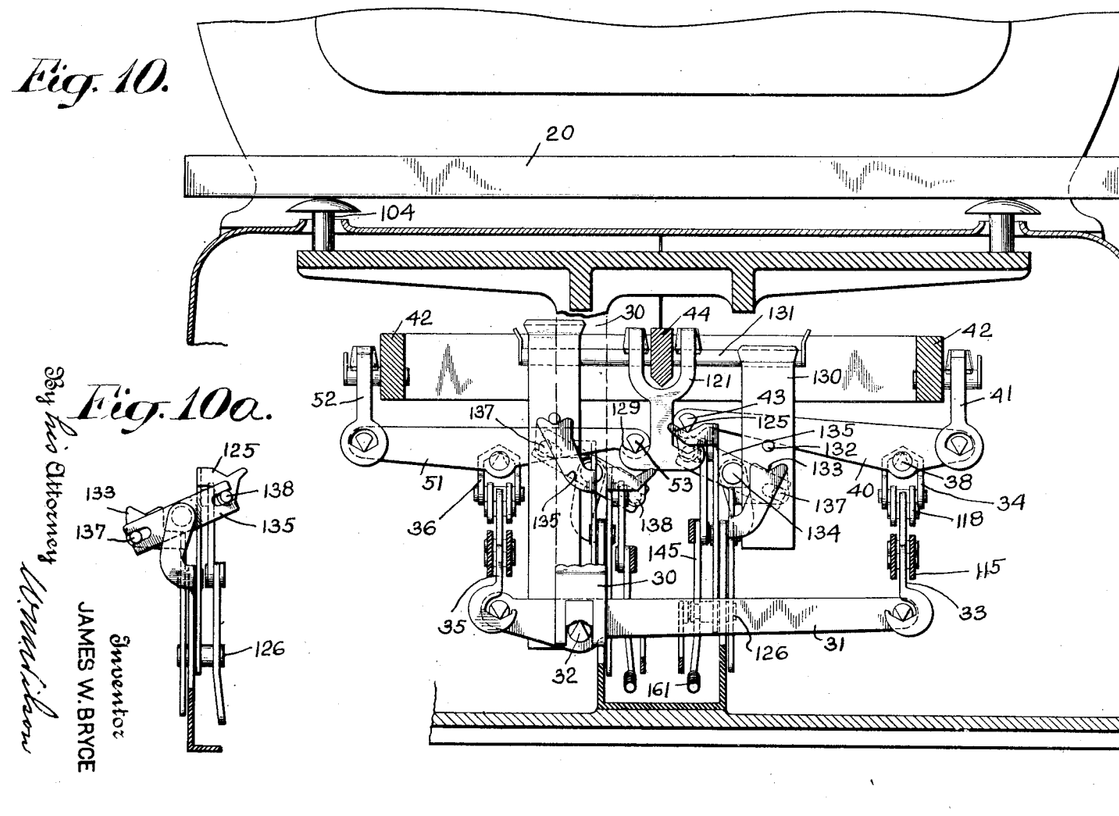
Fig. 10 is a section taken on the line 10—10 of Fig. 9.
Fig. 10a is a detail view of the lever control mechanism.

Referring now to Figs. 6 and 7, the counter weight 21, previously referred to, is supported on the closed end of a U-shaped lever 108 which is fulcrumed substantially midway of each leg at points 109. The free ends of the legs of this U-shaped lever are pivoted to the members 106 depending from the platform supporting structure 105. This lever and the counter weight merely counterbalance a portion of the load on the scale platform and have no other function in the scale operation. The portion of the weighing load which is not so counterbalanced is transmitted through dependent member 30 to lever 31 which it will be recalled from the explanation of Fig. 15 is connected through the factor levers to the weight beam 42 and the price beam 44. The connection of this lever to the weight beam 42 will first be described. Referring to Fig. 10 a bearing in the lower part of member 30 rests on knife edge 32 on lever 31. This knife edge as previously explained divides the lever into arms bearing the ratio of one to four to each other. A knife edge at the end of the longer arm of lever 31 rests in a bearing in shackle 33 depending from suitable knife edges on lever 115 (Figs. 7 and 10) the knife edges being located midway of the lever 115. This lever is provided at its ends with knife edges 116 and 117 resting in bearings in shackles depending from knife edges located at the mid points of levers 118 and 119, respectively. Knife edges 120 at the ends of lever 118 rest in bearings in stirrups 34 depending from two of the factor levers 40 (Figs. 7 and 10). Lever 119 is connected to the remaining two factor levers 40 in a similar manner. One end of each factor lever 40 pivots in a bearing in shackle 41 depending from a suitable knife edge on weight beam 42 (see Figs. 7 and 10). The shorter arm of lever 31 is connected through similar levers and linkage to factor levers 51 of which one end of each is connected to weight beams 42 through shackles 52. As this system is substantially identical with that just described in connection with factors 40 save for a different ratio of lever arms it will not be described in detail. The tape 61 (Fig. 7) for operating the load offsetting pendulum 60 and the weight indicating chart 68 is connected to the weight beam as indicated in Fig. 7 and from the description thus far it will be understood that as long as the ends of factor levers 40 and 51 distant from the weight beam 42 are properly supported all of the weighing load which is not counterbalanced by the weight 21 will be applied through the factor levers to the weight beam and will be effective in displacing the load offsetting pendulum 60 and the weight indicating chart 68. The manner in which these ends of the factor levers are supported will be clear from the following description of the price chart operating mechanism.

Figures 11, 11A, 12:
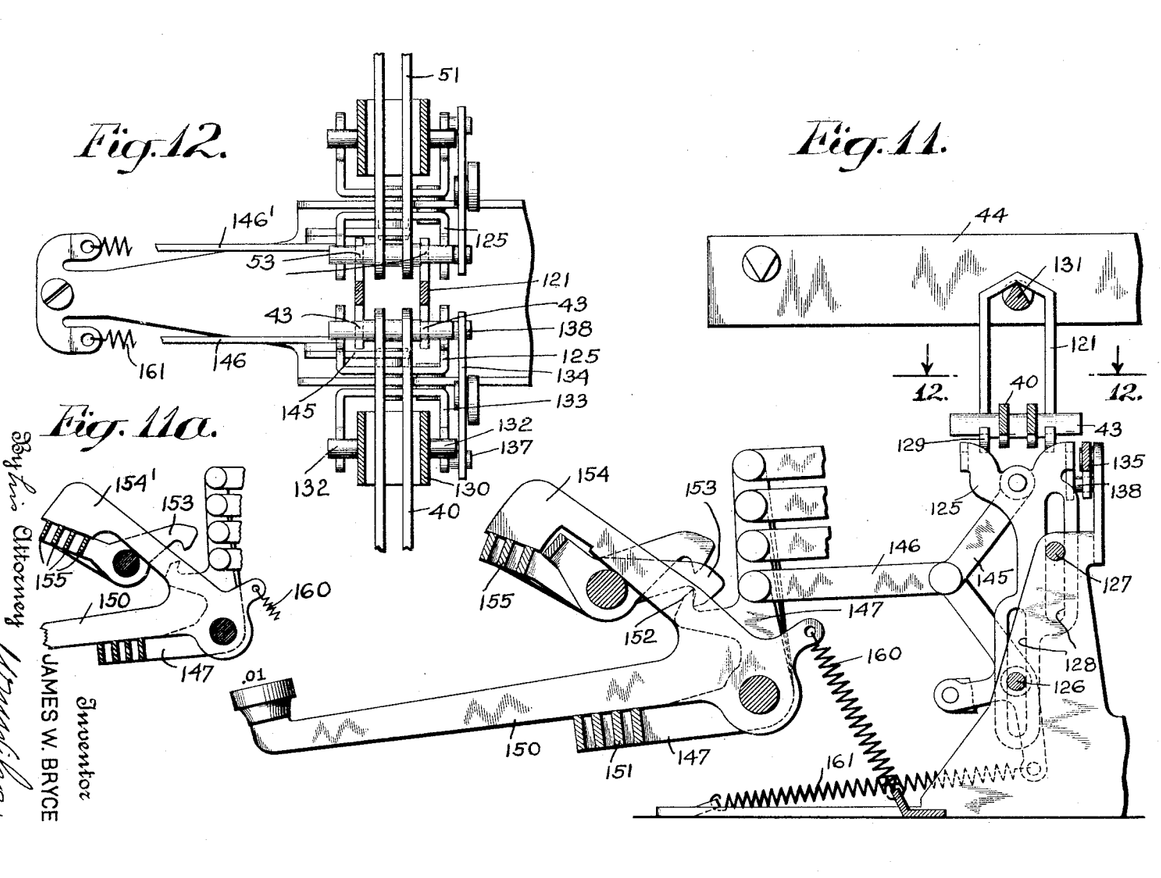
Fig. 11 is a detail view of the key operated mechanism for controlling the factor levers.
Fig. 11a is a detail of the clearing key mechanism.
Fig. 12 is a section taken on the line 12—12 of Fig. 11.

Referring to Figs. 10, 10a and 11 the ends of factor levers 40 and 51 opposite the shackles 41 and 52 are provided with knife edges 43 and 53 respectively. As the bearing structures for these knife edges are substantially similar they will be described only with respect to one of the levers 40, it being understood that this description applies equally well to the bearings and operating mechanism of levers 51. The knife edge 43 normally rests in a V-shaped slot in the top of a vertically shiftable member 125 (Figs. 10 and 11) constrained to a vertical path by pins 126 and 127 supported on a bracket attached to the base of the scale and coacting with slots 128 in member 125. It will be understood that one of these members is provided for each factor lever 40. The member 125 is normally held in elevated position to support the knife edge 43 by a toggle 145 shown in locking position in Figs. 9 and 10 and in broken position in Fig. 11. One link of this toggle is rotatably supported on pin 126 and the other link is pivoted to member 125. A spring 161 attached to an extension on the link which is pivoted on pin 126 constantly urges the toggle to locking position. The toggle may be broken by a link 146 pivoted to its joint as will be hereinafter described. When the toggle is in locking position the member 125 is elevated and supports knife edge 43 of the factor lever 40 as in Fig. 10; when the toggle is broken as in Fig. 11 the member 125 is lowered and deposits the knife edge 43 on bearings in double stirrup 121 depending from rod 131 on price beam 44. In this latter position, of course, the factor lever 40 is in operative relationship with the price beam. The member 125 (see Fig. 10a) carries a pin 138 which coacts with a slot in one end of a rock lever 135. A slot in the opposite end of this lever coacts with a pin 137 on a member 133 which is likewise reciprocable in a vertical direction and constrained to its vertical path by suitable slots coacting with the pins 126 and 127. When the member 125 is raised the member 133 is lowered and vice versa. The member 133 has a V-shaped cavity at its upper end which, when the member rises, encounters a pin 132 on a weight 130 (Fig. 10) normally resting on the bar 131 and lifts and holds it free of this bar. This weight is likewise suitably guided to prevent its interference with the other operating parts of the scale. The function of the weight 131 is to compensate the dead weight of factor lever 40 and the links connected thereto, the weight, of course, being placed on the price beam 44 when the factor lever 40 is removed from operative relationship therewith. It will be understood that each double stirrup 121 accommodates one factor lever 40 and one factor lever 51 and that normally all factor levers are held free of these stirrups but may have their knife edges placed on the bearings therein, if desired.

Figure 13:
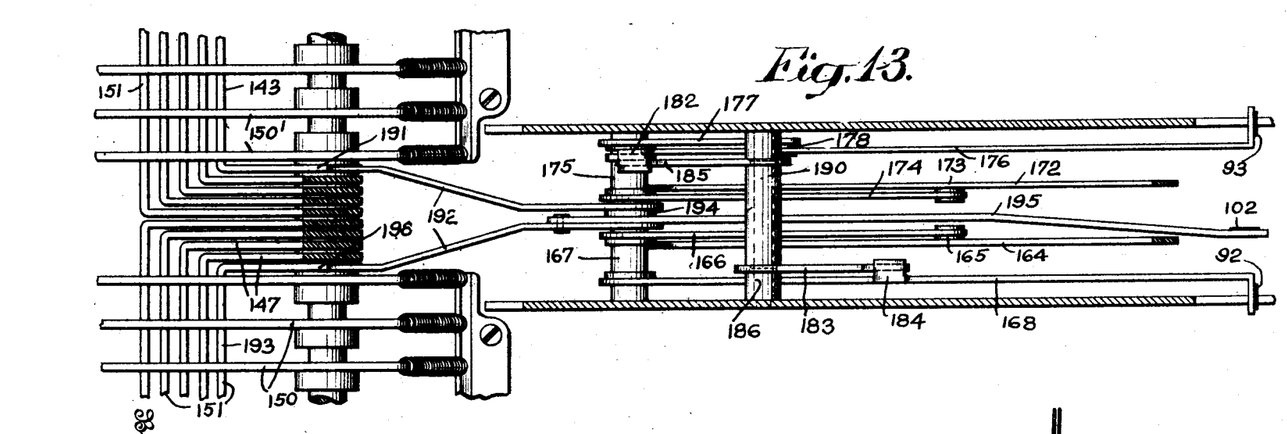
Fig. 13 is a plan view of certain mechanism for controlling the price scale.

Factor levers 40, hereinafter referred to as the units factor levers, and the factor levers 51, hereinafter referred to as the tens factor levers, are operated from separate banks of keys indicated in Fig. 6, the lower bank in the figure operating the units levers and selecting price per pound values from one to ten cents in increments of one cent and the upper bank operating the tens levers and selecting price per pound values from ten cents to one dollar in increments of ten cents. The operation of one of these keys of the units bank is illustrated in Fig. 11. A link 146 is pivoted at one end to the joint of a toggle 145 and at the other end to a bell crank 147 rigid with a bail 151 extending under all the key arms 150 of the units bank (see also Fig. 13). When any key of the bank is depressed all the bails 151 with their associated bell cranks 147 are rotated counterclockwise moving the links 146 to the left (in Fig. 11, breaking the toggles 145 and placing all the knife edges 43 of the factor levers 40 on their corresponding stirrups 121. Each bell crank 147 is provided with a hook 152 cooperating with a pivoted latch 153. Each latch 153 has an integral bail 155 likewise extending the length of the key bank shown in Fig. 6 and extension 154 on key arm 150 has a head portion shaped to rock certain of these bails. That shown in Fig. 11 rocks the three outer bails and prevents the attached pawls 153 from engaging the hooks 152 of their corresponding bell cranks 147. The inner bail is not rocked by this member and therefore its latch 153 engages the hook 152 of its bell crank 147 and holds the toggle 145 broken. When the key is released the remaining toggles are restored to locking position by their springs 161 again lifting the corresponding members 125 and removing the knife edges 43 of their factor levers from their corresponding stirrups 121. The factor lever 40 corresponding to the bell crank 147 which is latched, however, remains with its knife edges 43 on its stirrup 121 thus being placed in operative relationship to the price beam 44.

It will be obvious that by suitably shaping the heads of the extensions 154 for the different keys any one or any combination of the pawls 153 can be released to permit their corresponding factor levers to remain in operative relationship with the price beam after a key has been depressed and released. It will be obvious also that when any key is depressed to set up a combination of factor levers the act of depressing it will automatically wipe out any previous combination as depression of the key simultaneously places the knife edges 43 of all factor levers temporarily on their corresponding stirrups 121. The bank is also provided with a clearing key (indicated in Fig. 11a) whose function is to clear any combination of factor levers which might be set up, without at the same time setting up another combination. This key is similar to the operating keys save that its head 154' is shaped to rock all the bails 155 so that when the clearing key is depressed and then released none of the operating latches 153 may engage the hooks 152 of their bell cranks 147.

The tens factor levers 51 are similarly operated from the tens bank of keys. The price beam 44 (see Fig. 9) is connected to tape 64 and the downward pull on this tape bears a fixed relationship to the number and position of factor levers which are in cooperative relationship with the price beam. Consequently the price beam displaces its pendulum 63 and price scale 70 in a fixed ratio to the weight on the scale platform for each combination of factor levers selected. The price chart 70, then, may be graduated to represent total price of the article on the scale pan at the rate per unit weight selected.

Figures 3, 4, 5:
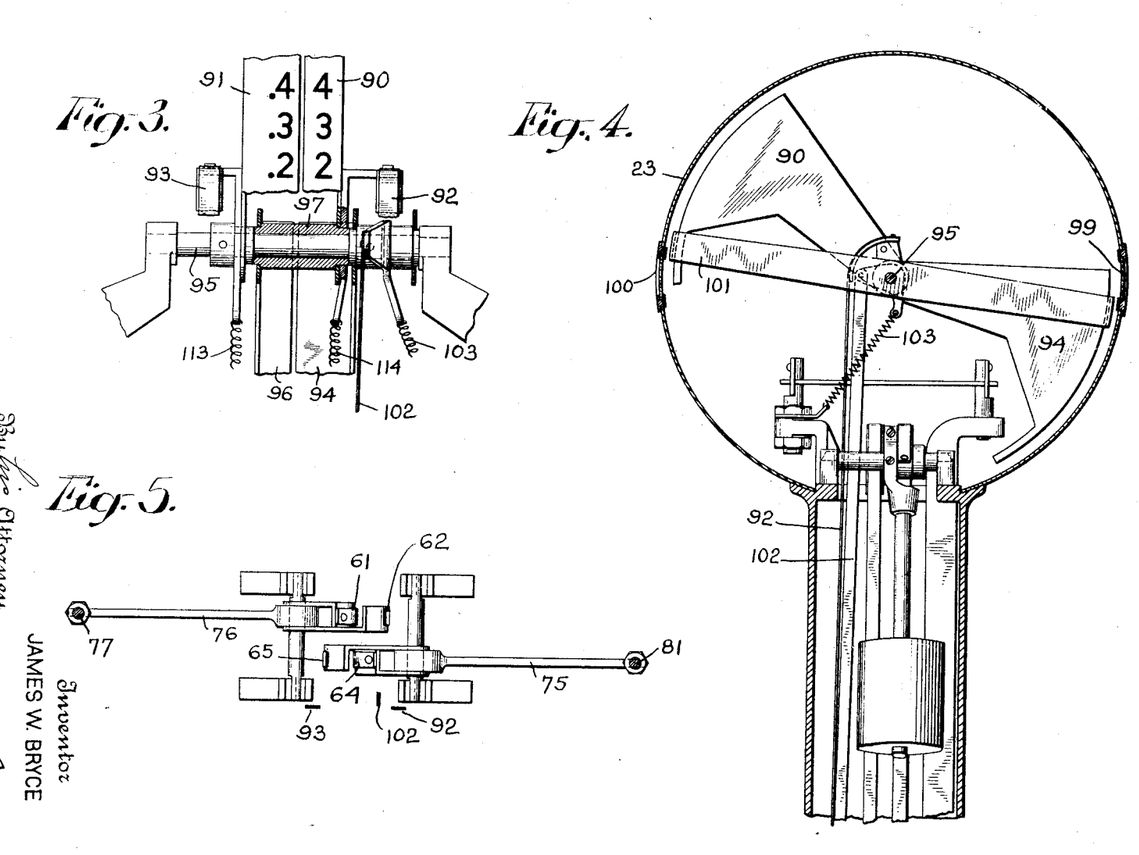
Fig. 3 is an enlarged detail view of the variable price scale incorporated therein.
Fig. 4 is a section taken on line 4—4 of Fig. 2.
Fig. 5 is a section taken on line 5—5 of Fig. 2.

The price index, by means of which a visual indication is given of the price per unit weight of the commodity being weighed, is controlled by the operating keys as will now be described in connection with Figs. 2, 3, 4, 8, 9, 13 and 14. Referring first to Fig. 3 the unit index is shown at 90 and the tens index at 91, these indices being in the form of pivoted, flanged sectors as shown in Fig. 4 with suitable markings on their flanges adapted to be selectively presented to a sight opening 100 in the chart housing 23. The tens units sector 91 together with a similar rearwardly extending tens sector 94 whose markings are presented to an opening 99 in the rear of the chart housing 23 are pinned to a rotatably mounted shaft 95 and this whole structure may be rotated by a downward pull on tape 93 attached to an operating sector on the structure but is normally held in zero position by a spring 113. The units sector 90 with a similar rearwardly extending units sector 96 and an operating sector are rigidly mounted on a sleeve 97 which is freely rotatable on the shaft 95. This structure may be rotated independently of the tens sectors by a downward pull on the tape 92 attached to the operating sector of the structure, the structure being normally held in zero position by spring 114. These indices are moved in response to depression of the operating keys as will hereinafter be explained to indicate which keys have been depressed or in other words what particular price per unit weight has been selected for the scale computation. Whenever these indices are in motion their readings are obscured by shutter 101 which is rotatably mounted on shaft 95 and normally held in non-obscuring position by a spring 103 but which is moved to obscuring position against the action of the spring by a tape 102 whenever an operating key in either bank is depressed.

Figure 9:
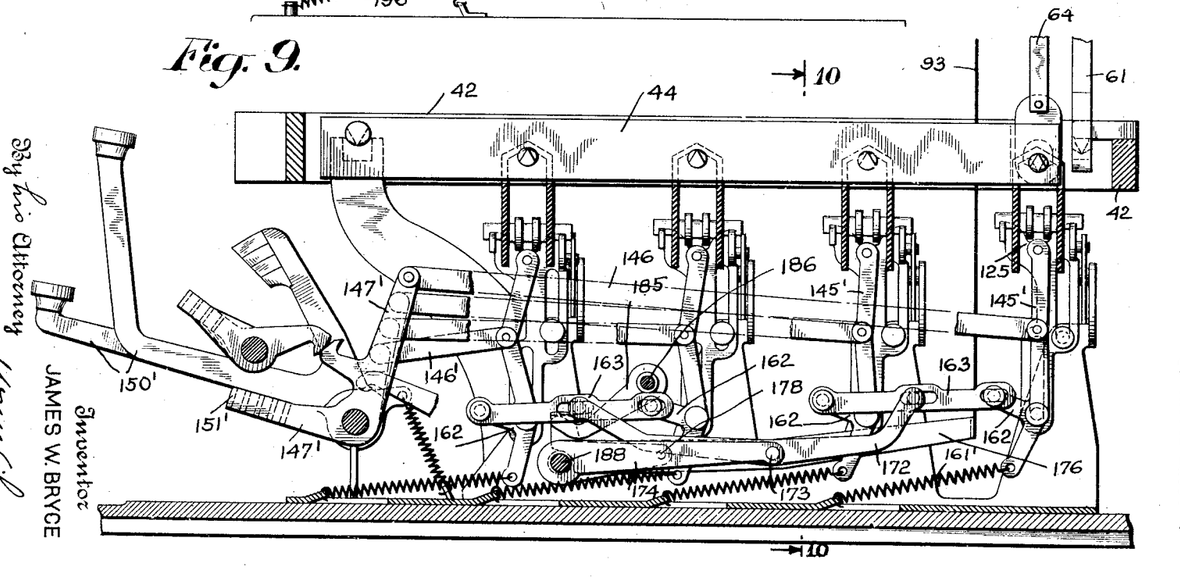
Fig. 9 is a section taken on line 9—9 of Fig. 6 showing certain details of the factor lever control mechanism.

The operation of the tens price per unit weight index and the units index are substantially similar except that the former is controlled from the tens operating keys and the latter from the units operating keys. In Fig. 9 the control mechanism of the tens index has been illustrated and operating parts similar to those already described for the units keys and toggles in connection with Figs. 10, 10a and 11 are indicated by the same reference numerals with the primes added. The toggles 145' are all shown in locking position or in the position in which they raise the members 125' to support the factor levers 51 free of the price beam 44. It will be noted that the links of the toggle to the extreme right are in substantial alignment with each other while the links of the second toggle are at a slight angle to each other, the links of the next toggle at a greater angle to each other, and so on. Now when the toggles are broken by the operating keys through links 146' it is obvious that the joint of the toggle to the extreme right must move a greater distance to the left than the joint of the next toggle and the joint of each successive toggle to the left need move successively decreasing distances to place the corresponding factor levers on the price beam. These different movements of the several toggle joints result from the different lengths of the arms of the bell cranks 147' cooperating with the operating keys 150'. An arm 162 is integral with the lower link of each toggle and obviously each of these arms moves through a different angular distance when its corresponding toggle is broken, the arm on the extreme right moving through the largest angle, the next through a smaller angle, the next through a still smaller angle, and so on. A link 163 is connected at one end to the arm 162 at the extreme right through a pin and slot connection and is pivoted at its other end to the arm 162 on the adjacent toggle. The toggle at the extreme left is similarly connected to its nearest neighbor. Now it is obvious that if any single toggle is broken the fact will be indicated by a definite movement of the center of the link 163 to which it is connected. Similarly if any combination of toggles is broken simultaneously the combination will be accurately indicated by definite movements of one or both of the links 163. A link 172 is joined at its opposite ends to the centers of links 163 by pin and slot connections and the movements of both links 163 are thereby superimposed on link 172. The center of this latter link indicated at the pivot 173 always moves a different predetermined distance for each toggle or combination of toggles which are broken. In other words the movement of the pivot point 173 is an accurate indication of the particular operating key which has been depressed. The movement of this pivot point is utilized to operate the tens price index. The pivot point 173 is connected to an arm 174 attached to a sleeve 175 (see also Fig. 13) freely rotatable upon a rod 188. An arm 177 is also attached to this sleeve and moves with the arm 174. A lever 176 having the operating tape 93 of the tens index attached at one end is pivoted to the end of arm 177 at 178. The end of this lever 176 distant from the tape 93 is provided with an arcuate bearing surface 181 (see Fig. 14) which normally rests on sleeve 175 and permits the lever to move about rod 188 as a pivot in response to movements of the arm 177. Obviously then the tape 93 will be given a definite downward displacement for each operating key depressed or in other words the selected price per unit weight is indicated on the tens unit 91.

The units keys operate in a similar manner save that in this case the lever 168 (Figs. 13 and 14) which corresponds to the lever 176 and which operates the tape 92 of the units index is rigidly fastened to the sleeve 167, corresponding to the sleeve 175 of the tens index, and there is no arm corresponding to the arm 177 of the tens unit. The normal operations of the structures are identical, however, as both levers 176 and 167 pivot about the rod 188 in response to movements of the toggles with which they are associated.

Figure 14:
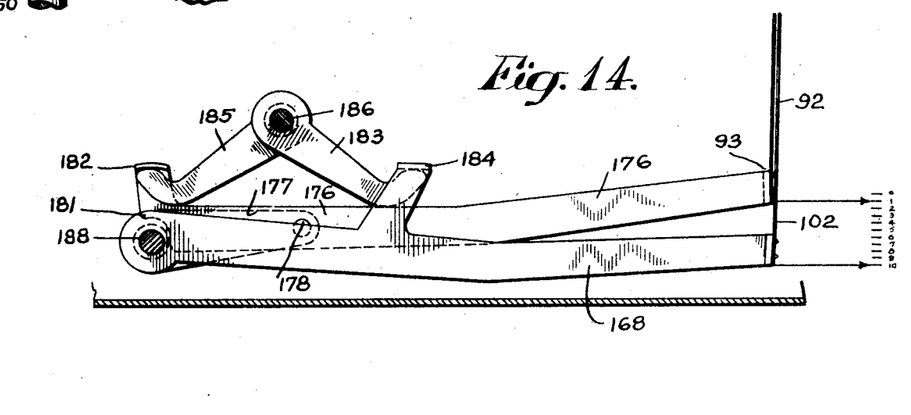
Fig. 14 is an elevation of the mechanism shown in Fig. 13.

Referring now to Fig. 6 it will be noted that there is a ten cent key in the tens bank which operates the tens index and a ten cent key in the units bank which operates the units index as just explained. The units index has no ten mark, however, as its markings as usual extend only from zero to 9 and another zero succeeds the 9 at the other end of the sector so if the ten cent key in the units bank is depressed it will operate the units index through ten points and bring it to zero and it will then be necessary to transfer one unit to the tens sector to properly indicate ten cents on the combined indices. This is accomplished as indicated in Fig. 14 which shows a detail of the operating levers 168 and 176 of the units tape 92 and units tape 93, respectively. The units lever 168 is shown fully depressed indicating that the ten cent key in the units bank has been depressed. A small scale to the right of the levers illustrates their several positions when the different keys are depressed. As shown the lever 168 has been depressed to its ten position and the lever 176 has been depressed to its one position. The lever 176 has an upward extension with a sidewise shoulder 182 and the lever 168 has an upward extension of a sidewise shoulder 184 the two shoulders extending toward each other (see Fig. 13). An arm 185 having one end underlying the shoulder 182 and an arm 183 having one end underlying the shoulder 184 are each rigidly attached to a sleeve 190 rotatable on the shaft 186. The lever 168 is free to move from its original zero position to its 9 position without the shoulder 184 encountering the arm 183. When the lever moves from its 9 to its ten position, however, the shoulder 184 engages the arm 183 and rocks it and the arm 185 clockwise whereupon the arm 185 lifts the shoulder 182 and rocks the lever 176 about pin 178 as a pivot, this movement being just sufficient to move the ten index one unit as indicated by the scale to the right in Fig. 14. Whenever the ten key in the units bank is depressed then the units sector will be displaced ten units and will indicate zero while one unit will be transferred to the tens index. This carried tens unit, of course, is cumulative with respect to any reading which might already be on the tens index or with respect to any entry which might be subsequently registered by depression of a key in the tens bank.

As previously explained the readings of the price per unit weight indices are obscured by the shutter 101, (Fig. 4) while the indices are in motion. The shutter is operated by the tape 102 which is attached at its lower end to an arm 195 (see Figs. 8 and 13). The arm 195 is attached to a sleeve 194 rotatable on rod 188 and arms 192 likewise attached to the sleeve extended oppositely from the arm 195. The ends of arms 192 coact respectively with cams formed integral with bails 143 and 193 extending beneath the tens operating keys 150' and the units operating keys 150, respectively (see Fig. 13). The cam for the tens bank is illustrated at 191 in Fig. 8. When any key in the bank is depressed as shown in this figure, the bail 143 is rocked and the high portion of the cam 191 rides under the end of arm 192 and rocks it upward lowering arm 195 and pulling down on tape 102 to move the shutter 101 to obscuring position. Depression of any of the tens keys 150' will likewise move the arm 195 downward through the operation of bail 143 and move the shutter to obscuring position. When the keys are released, of course, the spring 103 (see Fig. 4) moves the shutter 101 back to its non-obscuring position.

In the operation of the weighing scale which has been described, a load is placed on the platform and a combination of keys depressed corresponding to the price per pound of the article to be weighed. When the keys are depressed price shutter 101 will move into the range of vision of the price index and conceal the movements thereof while the proper combination of figures is being set up to indicate the selected price. A factor lever combination corresponding to the price indicated by the depressed keys is selected thereby and the ratio of the pull applied to bar 44 is controlled to actuate the total price scale 70 in a manner to indicate the total price of the article weighed. When the keys are released the price shutter is removed from the range of vision and the price per pound indicated through openings 99 and 100 in housing 23. The weight of the article is shown by chart 68 and the total price of the article by chart 70 both viewable through casing 23 at the front and rear, whereby the three sets of figures may be observed by both the salesman and the customer.

Factor levers 40 and 51 operate both the price beam and the weight beam. When certain of the levers are disconnected from the price beam they still remain attached to the weight beam whereby the latter is actuated by the entire combination of levers. In a scale constructed in the manner described above no factor levers are retained in an inoperative position but each lever is used at all times to actuate the weight beam of the scale.

Although this invention has been described as applied to a particular type of platform scale it is capable of general application in weighing scales of other types. Furthermore, although the embodiment chosen for explanation applies to the monetary system of the United States it will be obvious that it is equally applicable to the other systems. For example, the use of the British monetary system would involve merely the use of the required number of factor levers with different spacing along the scale beams from that indicated. It is to be understood then that the invention is only to be limited in accordance with the scope of the following claims.

What is claimed is:

1. In a weighing scale, a load support, a plurality of load offsetting devices independently operated thereby, a movable weight indicator displaced by one of said devices, a movable price indicator displaced by another of said devices, and means for effecting the displacements of said indicators in a definite ratio to each other.

2. In a weighing scale, a load support, a plurality of load off-setting devices and a set of factor levers interconnecting said support and said devices.

3. In a weighing scale, a plurality of load off-setting devices, a load support, a plurality of factor levers connecting said devices and said support, and means for permanently attaching said levers to one of said devices and selectively connecting said levers to the other of said devices.

4. In a weighing scale, a plurality of load off-setting devices, charts associated therewith, one of said charts being designed to indicate weight and the other of said charts being designed to indicate the product of the weight of an article and various prices per unit weight, a load support, a plurality of factor levers connecting said support and said devices, means for permanently connecting said factor levers to the weight indicating device and means for selectively connecting said levers to the price indicating device.

5. The combination set forth in claim 4 in which a price index is included for indicating the price per unit weight selected.

6. The combination set forth in claim 4 including a plurality of keys for selectively connecting the factor levers to the price indicating mechanism.

7. In a weighing scale, a plurality of load off-setting devices, a weight chart actuated by one of said devices and a price chart actuated by the other of said devices, a load support, a plurality of factor levers interconnecting said support and said devices, means for permanently connecting said levers to the weight indicating mechanism, means for selectively connecting the levers to the price indicating mechanism, said means comprising a plurality of keys, a price index chart, means controlled by said keys for operating said price index chart and a shutter mechanism operated by said keys for concealing the index chart while a combination is being set up thereon.

8. In a weighing scale including factor levers interconnecting a load support and a load offsetting device, means for selectively disconnecting said levers from said device comprising a movable support, a bearing on said support for co-acting with said lever when in raised position, and means for raising and lowering said support comprising toggle mechanism.

9. In a weighing scale, a weighing platform and load offsetting mechanism, a plurality of factor levers interconnecting said platform and said mechanism, means for selectively disconnecting said factor levers, said means comprising supports and adapted when raised to remove said levers from said mechanism, means for moving said supports comprising toggle joints, said toggle joints being designed to raise the factor levers located furthest from the fulcrum of said mechanism the greatest distance therefrom in order to allow free movement of said mechanism.

10. In a weighing scale, a weighing platform and load offsetting mechanism, a plurality of factor levers interconnecting said platform and said mechanism, means for selectively disconnecting said factor levers, said means comprising supports adapted when raised to remove said levers from said mechanism, means for moving said supports comprising toggle joints, designed to raise the factor levers located further from the fulcrum of said mechanism the greatest distance therefrom in order to allow free movement of said mechanism, an analyzing means for determining which of said toggles have been broken, said analyzing means comprising a plurality of links, said links being connected to extensions on said toggles whereby the movement and position of the toggles broken may be ascertained by the movement of said links.

11. In a weighing scale, load offsetting mechanism and price computing mechanism associated therewith to compute prices of articles weighed at different price rates, means for selecting different price rates for said computing mechanism, a price chart including a units portion and a tens portion and means controlled by said selecting means for controlling the position of said price chart according to selected price rates and transfer mechanism operable when the unit portion of said chart is moved from the 9 to the 10 position for increasing the reading of the tens portions of the chart by one unit.

12. In a weighing scale, load offsetting mechanism and price computing mechanism associated therewith to compute prices of articles being weighed at different price rates, means for selecting different price rates for the price computing mechanism, a price index chart comprising units and tens portions, means for positioning said portions in accordance with the selected index price and means interconnecting said units and tens operating mechanism for increasing by one unit the indication of said tens portion when the unit portion is in the 10 position.

13. In a weighing scale, load offsetting mechanism and price computing mechanism associated therewith to compute prices of articles being weighed at different price rates, means for selecting different price rates for the price computing mechanism, a price index chart for indicating the selected price rate, operating means therefor comprising a lever normally fulcrumed at one end, an auxiliary pivot for said lever and means for moving said lever about said auxiliary pivot to increase the reading of said chart by one unit.

14. In a weighing scale including a weight beam and factor levers connected thereto, means for selectively disconnecting said factor levers comprising a support, mechanism for raising said support from said lever, an auxiliary weight and a means for positioning said auxiliary weight upon said beam when said support is raised, said means comprising an auxiliary support for said weight and a link connecting said two supports whereby movement thereof occurs in opposite directions.

15. In a weighing scale including a weight beam and factor levers normally connected thereto, means comprising toggle connections for removing said levers from said beam, a plurality of keys for operating said toggle connections, a pivoted member actuated by said keys, means connecting said toggles to said pivoted member, said means being connected to said member at progressively increasing distances from its pivot point whereby the extent of movement of said toggles may be determined, an extension on said keys, a plurality of latches for retaining certain of said toggles in broken position and means controlled by said extension for selectively operating certain of said latches.

16. In a weighing scale, a load support, a pivoted beam and means interconnecting said support and said beam comprising a plurality of levers which are pivoted extraneously of said beam at one of their ends and pivotally connected to said beam at different distances from its pivot point at their other ends.

17. In a weighing scale, a load support, a pivoted beam and means interconnecting said beam and said support comprising a series of levers which are pivoted extraneously of said beam at one of their ends and pivotally connected to said beam at progressively increasing distances from its pivot point at their other ends.

18. In a weighing scale, a load support, a pivoted beam and multiple ratio mechanism intermediate said support and said beam comprising a plurality of levers which are pivoted extraneously of said beam at one of their ends and means for removably pivoting the other ends to said beam at different distances from its pivot point.

19. In a weighing scale, a load support, a pivoted beam and multiple ratio mechanism intermediate said beam and said support comprising a series of levers which are pivoted extraneously of said beam at one end and removably pivoted to said beam at progressively increasing distances from its pivot point at their other ends.

20. In a weighing scale, a load support, a pair of beams independently pivoted and means interconnecting said beams and said load support comprising a plurality of levers each permanently pivoted to one of said beams and removably pivoted to the other.

21. In a weighing scale, a load support, a pair of beams independently pivoted and means for connecting said load support to said beams comprising a plurality of levers permanently pivoted to one of said beams at different distances from its pivot point and means for selectively pivoting the other end of said levers to the other beam at different distances from its pivot point.

22. In a weighing scale, a load support, a pair of beams independently pivoted and means for connecting said load support to said beams comprising a plurality of levers permanently pivoted to one of said beams at progressively increasing distances from its pivot point and means for selectively pivoting the other end of said levers to the other beam at progressively increasing distances from its pivot point.

23. In a weighing scale comprising a pair of load offsetting devices with an indicating mechanism associated with each, a load support and multiple ratio mechanism permanently associated with one load offsetting mechanism to effect the same in constant ratio to a load on said load support and means for selectively associating the mechanism with the other load offsetting mechanism to permit operation thereof in varying ratios to a supported load.

24. A force measuring instrument comprising a pair of indicating devices, load offsetting means for controlling the operation of one of said devices in constant ratio with an applied load and for controlling the operation of the other of said devices at selected variable ratios to the applied load and key controlled mechanism for selecting the various ratios.

25. A force measuring instrument comprising a pair of indicating devices, load offsetting means for controlling the operation of one of said devices in constant ratio with an applied load and for controlling the operation of the other of said devices at selected variable ratios to the applied load, said means including a plurality of factor levers permanently associated with one of said indicating devices and selectively associable with the other indicating device.

26. In a weighing scale, a weight chart, a price chart for indicating prices at a multiplicity of price rates and a price rate chart, said charts being in juxtaposition to permit simultaneous viewing of each, keys for controlling the operation of the price rate chart and selecting a corresponding rate for the price chart and load offsetting mechanism associated with the weight chart and the price chart for operating both on a weighing operation.

In testimony whereof I hereto affix my signature.

JAMES W. BRYCE.